United States Patent

[11] 3,604,003

| [72] | Inventors | Michael Freier;<br>Leonard P. Balazer, both of Sunnyvale, Calif. |
|---|---|---|
| [21] | Appl. No. | 817,614 |
| [22] | Filed | Apr. 16, 1969 |
| [45] | Patented | Sept. 7, 1971 |
| [73] | Assignee | Lockheed Missiles & Space Company, A Division of Lockheed Aircraft Corporation Sunnyvale, Calif. |

[54] RANGE COMPUTER
2 Claims, 3 Drawing Figs.
[52] U.S. Cl. .................................................. 343/112 D, 235/150.26
[51] Int. Cl. ...................................................... G01s 5/14, G01s 11/00
[50] Field of Search ............................................ 343/112.3; 235/150.26

[56] References Cited
UNITED STATES PATENTS

| 3,134,104 | 5/1964 | Murphree et al. ............ | 343/112.3 |
| 3,430,243 | 2/1969 | Evans ........................... | 343/112.3 |

Primary Examiner—Rodney D. Bennett, Jr.
Assistant Examiner—Richard E. Berger
Attorneys—Harry A. Herbert, Jr. and Julian L. Siegel ABSTRACT: A range computer for use in a dual source input ranging system where a signal representing the difference between the dual sources is fed to a differential amplifier together with a normalizing signal from one of the sources. A null-seeking servo fed by the differential amplifier parallel drives an input potentiometer controlling the input level of the normalizing signal to the differential amplifier and an output potentiometer controlling the volume of a DC reference voltage, the output of the potentiometer representing the range.

RANGE COMPUTER

BACKGROUND OF THE INVENTION

This invention relates to range computers and more particularly to a range computer for a dual input monopulse system for determining the range of an electromagnetic radiator.

Monopulse ranging systems of the type using two input sources for determining the distance from an electromagnetic radiator to a moving vehicle offer a high degree of accuracy and reliability and can detect range from a single pulse from the emitter. If the vehicle is an aircraft, one input can be derived from an antenna in the tail and another in the nose. Such a dual input ranging system is disclosed in my copending application filed herewith and having Ser. No. 817,616. The present invention provides an improved range computer which can be used for such a range finder where the two inputs are fed into the range computer.

SUMMARY OF THE INVENTION

In the present invention, a difference signal representing the difference between the dual input sources is fed into a differential amplifier together with a normalizing signal from one of the inputs. The differential amplifier controls a null-seeking servo that adjusts the normalizing signal to be equal to the difference signal and simultaneously adjusts a potentiometer controlling a reference voltage, the adjusted reference voltage representing the range.

It is therefore and object of the invention to provide an improved range computer.

It is another object to provide a range computer that can be used with a dual input ranging system installed on a moving vehicle, such as an aircraft.

It is still another object to provide a range computer having a range system that allows in-flight adjustment.

These and other advantages, features and objects of the invention will become more apparent from the following description taken in connection with the illustrative embodiment in the accompanying drawings, wherein:

DESCRIPTION OF THE PREFERRED EMBODIMENT

Figure 1:
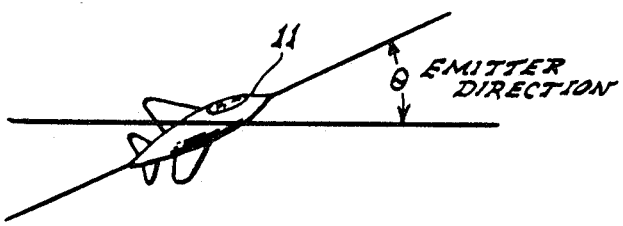
FIG. 1 shows the angular relationship of an aircraft with reference to the source of electromagnetic radiation.

Referring to FIG. 1, in a dual input range-finding system one input or channel can be derived from an antenna located in the nose of aircraft 11 and the other in the tail. The difference signal strength is approximately proportional to radial distance of the two antennas from the transmitter. Signal strength is proportional to $\cos \theta$ where $\theta$ is the angle of vehicle 11 in relation to the target or emitter and decreases as the aircraft heading deviates from the emitter bearing.

The range computer performs the equation $$R = \frac{2\Delta R P_R}{\Delta P_R} = \frac{2\Delta R P_R}{P_{R_1} - P_{R_2}}$$

where $R$ = Range
$P_R$ = Power received
$P_{R_1}$ and $P_{R_2}$ = Power received from the two sources.
Since $P_{R_1}$ and $P_{R_2}$ are very nearly the same level, receiver linearity errors are negligible. $P_R$ is more correctly $$\frac{P_{R_1} + P_{R_2}}{2}$$

However, the difference between $P_R$ and $P_{R_1}$ or $P_{R_2}$ amounts to one part in 4,000, and consequently the error due to using $P_{R_1}$ or $P_{R_2}$ is negligible. The details of the derivations of these equations appear in the aforementioned application.

Figure 2:
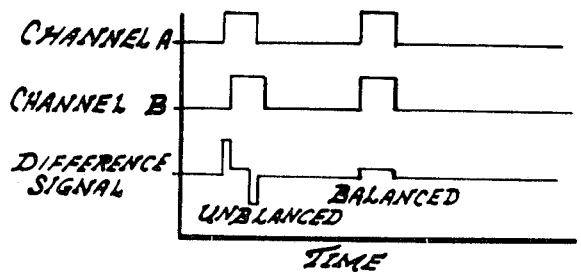
FIG. 2 is a waveform diagram showing the pulses from the emitters and the difference signals which comprise the inputs to the range computer.

The ranging system processes the signals from the pair of sources and the difference signal is fed to the range computer. The input signals to the range computer, designated as Channel A and Channel B, are shown in FIG. 2. If the two input signals are not synchronous, large amplitude outputs will occur during the time in which the signals do not overlap. If the Channel A signal leads Channel B signal, the resulting difference signal will be equal to the value of Channel A signal alone until the Channel B signal arrives. This causes a high amplitude positive excursion at the beginning of the output pulse waveform. When both signals are present, the output consists of the relatively low amplitude difference signal and followed by a high amplitude negative excursion when Channel A pulse has passed through the amplifier and Channel B signal is still present. If Channel B signal leads Channel A signal, this sequence is reversed and the output waveform then consists of a high amplitude negative excursion followed by the difference signal and then by a high amplitude positive excursion.

Figure 3:
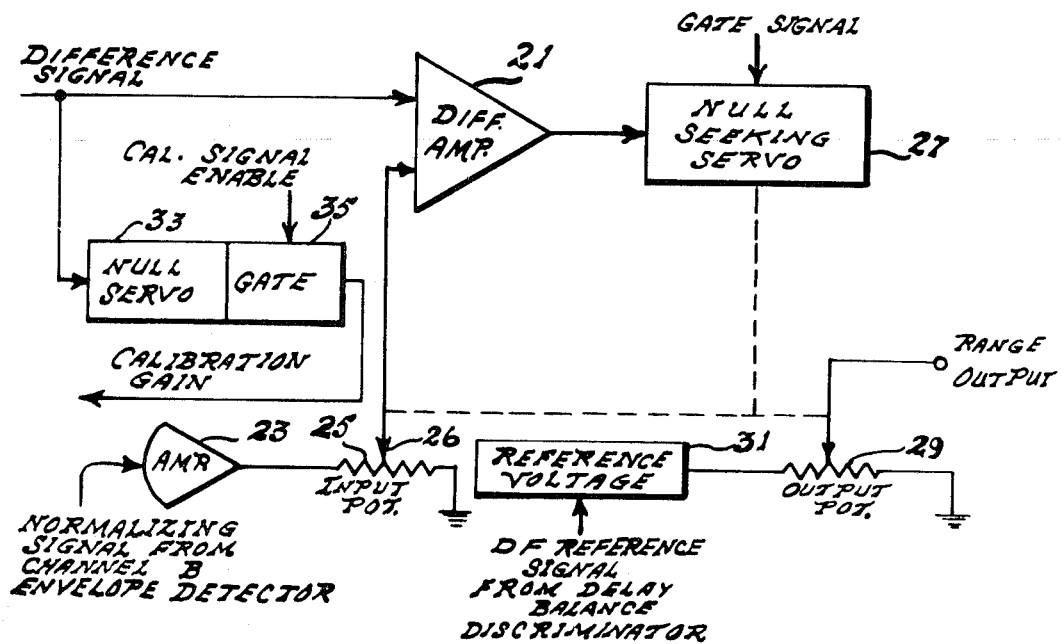
FIG. 3 is a block diagram showing an embodiment of the invention.

The range computer shown in FIG. 3 includes mechanically linking potentiometers for clarity of explanation; however, the functions depicted can be performed electronically. The difference signal is inserted directly into differential amplifier 21 while the channel normalizing signal is passed through fixed gain amplifier 23 and then through precision potentiometer 25 to signal ground. Some portion of the input voltage of potentiometer 25 is taken off at tap 26 and fed to input differential amplifier 21. The difference output from differential amplifier 21 is fed back through null-seeking servo 27 to adjust input potentiometer 25 to a position where its voltage is equal to the input difference signal. When balanced, the position of the potentiometer 25 is proportional to the ratio of the direct signal and the difference signal and therefore proportional to the range for a fixed flight path heading.

Output potentiometer 29 is ganged and driven in parallel with input potentiometer 25 which is in the feedback loop. Voltage reference for potentiometer 29 is controlled by a signal that is proportional to the angle of the flight path relative to target direction, thus compensating for effective changes in the difference in radial distance of the two antennas from which Channel A and Channel B are derived. The output of potentiometer 29 is proportional to range for all flight headings.

The range computer also provides in-flight calibration of the ranging system for balancing the gain of both channels by automatically adjusting one of the channels to obtain a null difference output at null servo 33 through gate 35.

We claim:

1. A range computer for a dual source input ranging system for determining range from a moving vehicle to a radiating target comprising:
    a. a difference signal source representing the distance between the dual sources;
    b. a normalizing signal source from one input of the dual source;
    c. a differential amplifier fed by the difference signal source and the normalizing signal source;
    d. an input potentiometer having a movable tap interposed between the normalizing signal source and the differential amplifier for adjustment of the input thereto;
    e. a null-seeking servo fed by the differential amplifier;
    f. an output potentiometer having a movable tap fed by the null-seeking servo and ganged controlled with the input potentiometer;
    g. a voltage reference source connected to the output potentiometer; and
    h. a signal source connected to the reference voltage source for the control thereof, the signal being proportional to the angle of the vehicle path relative to target direction.

2. A range computer according to claim 1 which further comprises means for automatically calibrating the ranging system by adjusting one input of the dual source, the calibrating means comprising:

a. a null servo fed by the difference signal; and
b. a gate circuit fed by the output of the null servo, the gate being activated by a calibration enabling signal.